Dec. 24, 1968     E. C. DUDEK     3,417,511
BELT SANDER
Filed April 15, 1965     2 Sheets-Sheet 1
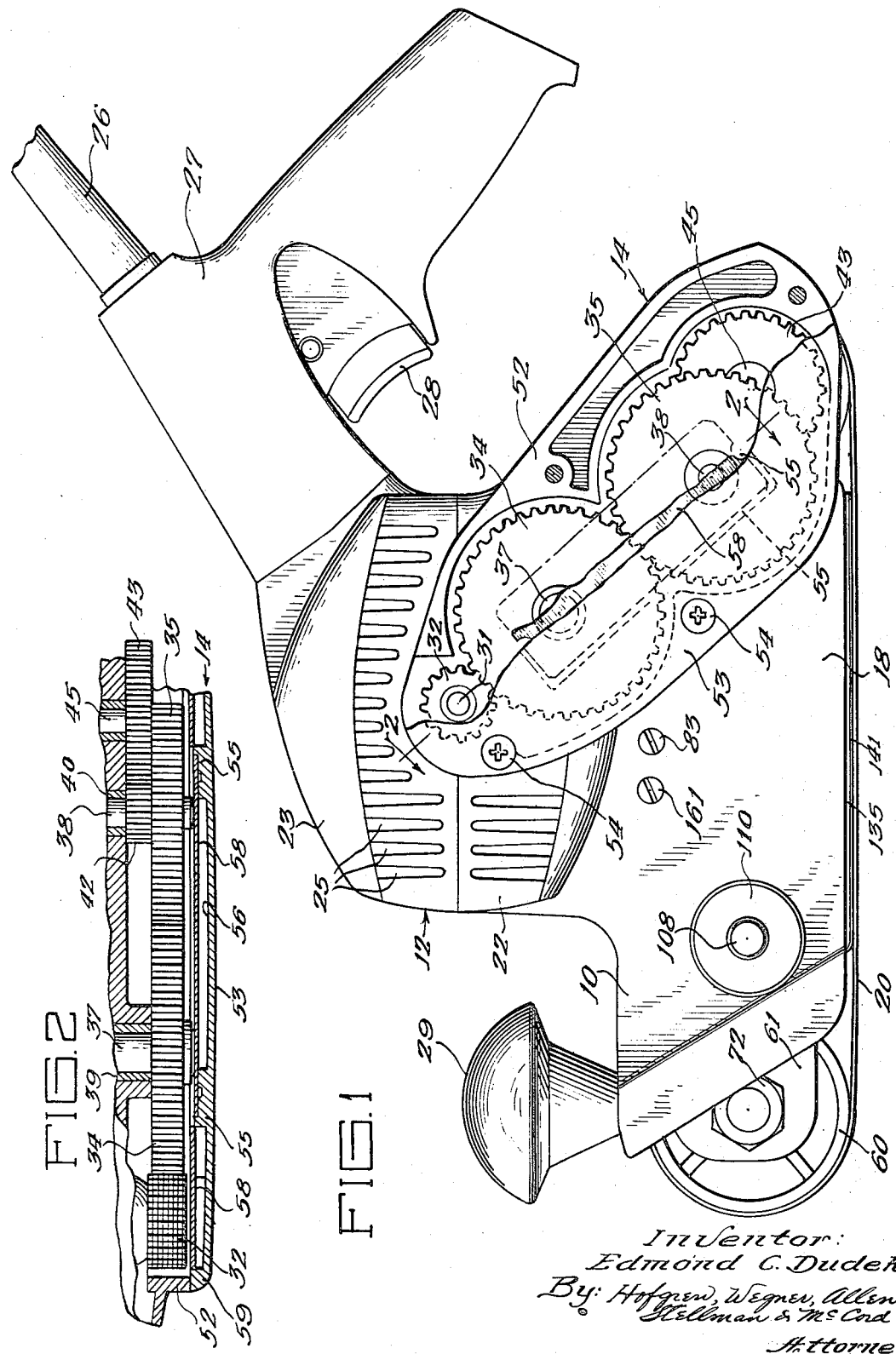
Inventor:
Edmond C. Dudek
By: Hofgren, Wegner, Allen,
Stellman & McCord
Attorneys

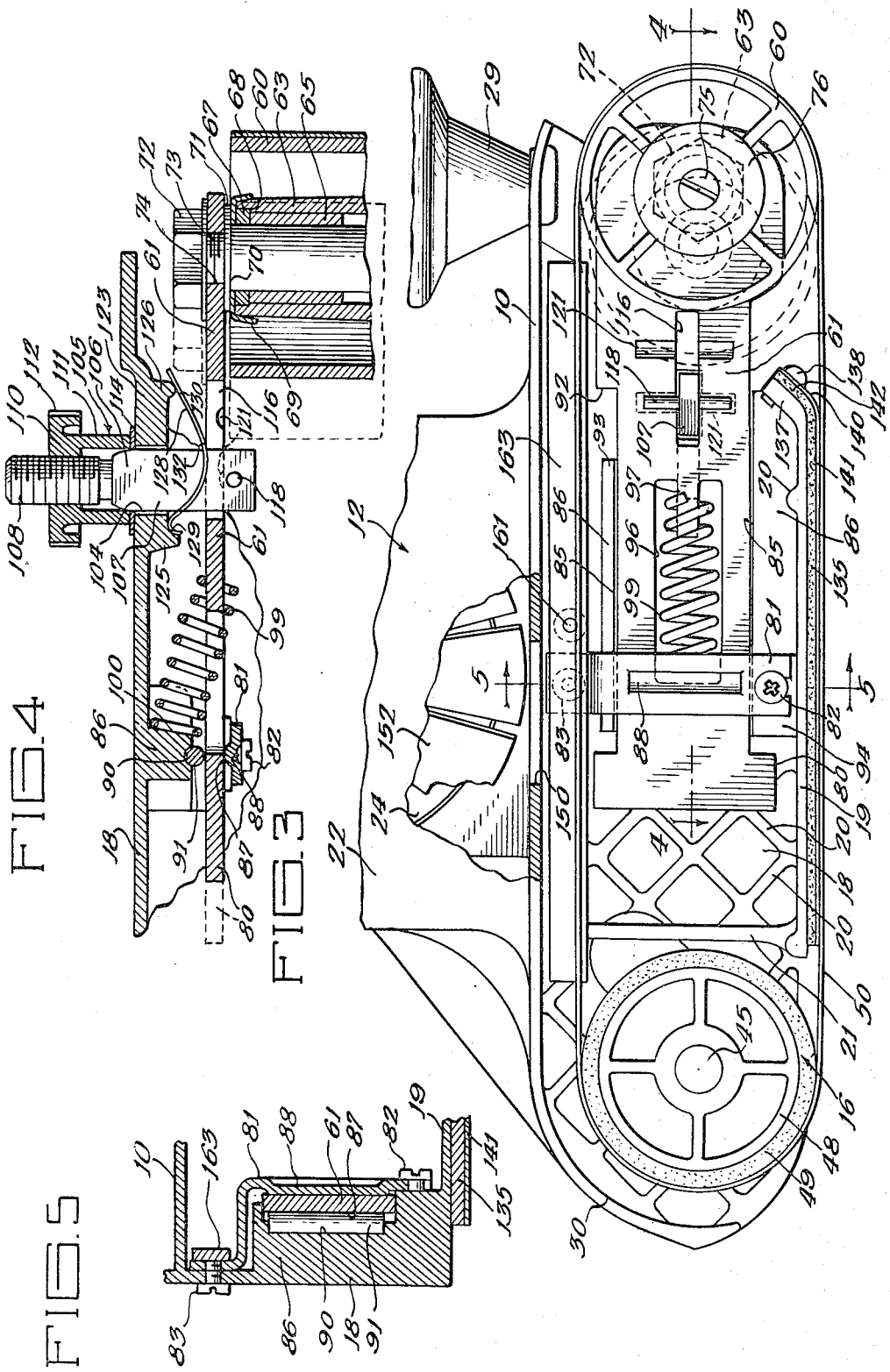

United States Patent Office 3,417,511
Patented Dec. 24, 1968

3,417,511
BELT SANDER
Edmond C. Dudek, Pickens, S.C., assignor to G. W.
Murphy Industries, Inc., a corporation of Texas
Filed Apr. 15, 1965, Ser. No. 448,458
4 Claims. (Cl. 51—135)

ABSTRACT OF THE DISCLOSURE

Surface dressing tools which are subjected to considerable shock loads between the motor and the working surface have a laminated fibrous gear positioned in the gear train to reduce transmission of the shock to the motor. In addition a special wear plate is provided for keeping the gear supporting shafts in position in the drive train for reducing the number of bearings in the system and prolonging the useful life of the remaining bearings. In continuous belt tools, a means is provided for cooling the upper reach of the belt by directing cooling air from the motor down onto the belt. A plate provides a cantilever arrangement for supporting the idler roll and which plate has a fixed axis about which it pivots and relative to which it translates in positioning the idler roll with respect to the driving roll. An adjusting member is used to vary the relationship between the axes of the idler and driving rolls, and also to serve as part of the latch for locking the idler roll in a retracted position relative to the driving roll.

---

This invention relates to portable surface dressing devices and more particularly to a surface dressing tool of the continuous belt type.

A general object of this invention is to provide a machine of the character described which is of new and improved construction capable of long, trouble-free operation and adapted to be easily understood and simply adjusted.

It is a principal object of this invention to provide a surface dressing tool having improved power transmission means for eliminating the deleterious effects caused by transmitting shocks to the motor from the work area.

It is a further object of this invention to provide an improved surface dressing tool employing a novel laminated fibrous gear in the drive means.

It is a still further object of this invention to provide an improved means for mounting a shaft and its associated gear for eliminating some of the bearings in the drive train.

Still another object of this invention is to provide an improved wear means for the gear mounting elements for prolonging the useful life of the bearings in the tool.

And still another object of this invention is to provide an improved means for dissipating heat from the dressing belt.

Still another object of this invention is to provide an improved means for clearing dust and other obstructions from around the belt on the work surface.

Another object of this invention is to provide an improved means for adjusting the idler roll whereby parallelism of said roll with respect to the driving roll is accurately obtained and maintained.

Another object of this invention is to provide an improved abrasive belt tensioning mechanism.

Another object of this invention is to provide an improved latching mechanism for retaining the idler roll in a depressed or retracted condition for loading and unloading an abrasive belt on the device.

Still another object of this invention is to provide an improved guide and wear plate for reducing wear on the inside of the housing adjacent to the return pass of the belt.

A still further object of this invention is to provide an improved bearing and pivot means for mounting the idler roll relative to the housing.

Another object of this invention is to provide an improved supporting structure for the idler roll which is adapted to move substantially friction-free relative to the housing.

And still a further object of this invention is to provide an improved release mechanism for the support of the idler roll whereby the idler roll can be quickly and efficiently returned to the belt tensioning position from the retracted or loading position.

It is still another object of this invention to provide an improved backing element on a supporting shoe for further tensioning of the belt and for exposing the working pass of the belt more efficiently to the surface to be dressed.

Still another object of this invention is to provide an improved surface material on the driving roll adapted to more positively grip the inside of the abrasive belt for reducing the ill effects caused by slipping of the belt over the rolls.

Other objects and advantages will become apparent from the following detailed description taken in connection with the accompanying drawings in which:

FIGURE 1 is an elevational view of the portable belt-type sander having parts broken away;

FIGURE 2 is a cross-sectional view taken along the line 2—2 of FIGURE 1;

FIGURE 3 is a partial elevational view of the opposite side of the sander slightly enlarged and with parts broken away and in section;

FIGURE 4 is a cross-sectional view taken along the line 4—4 of FIGURE 3; and

FIGURE 5 is a cross-sectional view taken along the line 5—5 of FIGURE 3.

While the invention is susceptible of various modifications and alternative constructions, it is herein shown and will hereinafter be described in a preferred embodiment and, more particularly, an embodiment especially adapted for use with a belt type sander. It is not intended, however, that the invention is to be limited thereby to the particular embodiment shown. On the contrary it is intended to cover all modifications and alternative constructions falling within the spirit and scope of the invention as defined in the appended claims.

As shown in the drawings for purposes of disclosure, the invention is illustrated in a portable electric belt sander having means for tensioning the sanding belt on the machine. A means is provided for releasing the tension on the belt and includes the additional feature of being adapted to lock the tensioning means in the collapsed or released position permitting removal and replacement of the sanding belt. By pressing on the tensioning means in its collapsed or released position, the means for holding the tensioning means released is disengaged whereupon the tensioning means moves into the tensioned position for holding the sanding belt in operative position on the device. The means for tensioning the belt on the device also serves as a tracking mechanism for the sander for adjusting the parallelism between the driving roll and the idler roll so as to provide the sanding belt with the correct and balanced loading across its width whereupon the belt will wear evenly, will not creep off the rolls, will move evenly across the work surface and will be less likely to tear or fray on the edges.

A special bearing arrangement is provided between the tensioning means and the housing for minimizing the resistance due to binding between parts of the tensioning means and the housing. The bearing also serves as the axis about which the tensioning means pivots in its adjustments relative to the housing for aligning the parallelism of the axes of the rolls. As the belt rotates in the housing it wears and abrades against the inside of the side walls of the housing. The bad effects of this abrading have been eliminated by the provision of a guide and wear plate which serves not only to reduce wear, but also serves to guide and position the sanding belt relative to the housing.

A sanding belt cooling means is provided for wherein air is forced past the motor and onto the return pass of the sanding belt to assist in dissipating the heat built up in the belt from friction between the belt and the surface being dressed and from the flexing of the belt over the rolls.

The portable sander also has means for direct drive between the motor and the drive roll of the sander including means adapted to reduce noise and brush wear while at the same time absorbing shocks between the drive roll and the motor. A flexible means is mounted in the cover for the direct drive means resiliently positioning the drive members in their bearings so that a cantilever mounting for the drive members can be used. The flexible means also serves as a wear plate between the drive means and said cover.

As shown herein for purposes of disclosure, the sanding machine or device has a housing or frame comprising a mounting base 10 which supports the motor and casing 12, the drive train and cover 14 and the operative working parts 16 of the machine. The mounting base 10 is substantially flat and generally intended during operation of the machine to be substantially parallel to the surface being dressed and has a vertically disposed side wall 18 downwardly depending from one side edge thereof. The lower edge of said wall 18 has attached thereto an inwardly extending supporting shoe 19 lying substantially parallel, to spaced from and underneath said mounting base 10.

The inside of the side wall 18 and the inner surface of the supporting shoe 19 have reinforcing ribs 20 and web 21 to add rigidity to the frame for supporting the operative parts on the mounting base 10. The web 21 does not extend all the way to the mounting base 10 but rather extends from the supporting shoe 19 to the wall 18 leaving a space between the web and the base 10. Integrally formed with the upper surface of the mounting base 10 is a lower portion 22 of the motor casing 12 having a top portion 23 secured thereto as by screws. The motor casing encloses a motor, the details of which are not shown, but which is designated generally as 24. The top portion 23 and lower portion 22 have air vents or louvers 25 therein for admitting air into the casing and around the motor for cooling and for other purposes more fully disclosed hereinafter.

Formed with the top portion 23 of the casing 12 and extending at an angle upwardly from one side thereof is the pistol grip type handle 27 having a trigger switch 28 for actuating the motor 24 for driving the sander. An electric cord 26 adapted to be plugged into an electric outlet passes through the handle 27 to the switch 28 and to the motor in a conventional manner. The rear portion 30 of the mounting base 10 curves downwardly and partially in an encircling manner to enclose and protect certain operative parts of the sander. A separate hand holding knob 29 is screwed into the fore part of the mounting base 10 so that the sander can be operated with two hands if desired; that is, one hand on the handle 27 and the other hand guiding, bearing down or lifting up on the front of the sander through knob 29.

The motor 24 has an armature shaft 31 extending transversely of the casing 12 and upon which shaft is keyed a laminated gear 32. The gear 32 will be described more fully hereinafter. The larger gears 34, 35 mesh with each other and with said laminated gear 32 and are rotatably supported on the side of the casing 12 and wall 18 by the stub shafts 37, 38, respectively, extending into bearings 39, 40 in said housing 12 and wall 18. Smaller gear 42 is keyed to the shaft 38 behind the large gear 35 and rotates therewith and meshes with gear 43 keyed to the shaft 45. The shaft 45 passes through mounting bearings (not shown) seated in the wall 18 and is fastened to the hub 47 of the driving wheel or roll 48 for rotation therewith. The driving roll 48 has a layer or sleeve 49 of rubber or rubber-like material around its outer periphery which presents a surface of relatively high coefficient of fiction to a sanding belt 50 passing around said roll.

The gear train 32, 34, 35, 42, 45 is nested in a hollowed out raised enclosure 52 on the side of the casing 12 and wall 18. A cover 53 is secured by screws 54 to the outer face of said enclosure 52 and has a raised rectangularly shaped boss 55 formed in the inner face thereof. A shallow recess 56 is formed within the confines of the boss 55. An elongate sheet or wear plate 58 of spring steel or the like is mounted to the boss 55 on the inside or said cover 53 in substantially overlapping relationship to said recess 56 such that throughout the major portion of the body of the wear plate there is no backing against the cover body. The center portion of the wear plate 58 is juxtaposed with and engages against the ends of the shafts 37, 38 on which the large gears 34, 35, respectively, are mounted. The wear plate 58, being resilient and being spaced from the bottom of the recess 56, is adapted to resiliently urge the shafts 34, 35 and their associated gears inwardly toward the housing 12 and wall 18 into their bearings 39, 40. In this way the shafts 37, 38 supporting the gears 34, 35 can be cantilever mounted for operation in a highly efficient and novel fashion. The cantilever mounting eliminates the need for an extra set of bearings on the outside of the gear and simplifies the installation, lubrication, inspection and service of said gears and their mountings. A gasket 57 of cork or other suitable material is fit into the face portion of the inside of the cover 53 between the edges of the wear plate 58 and the attaching rib 59 of said cover 53.

Underneath the mounting base 10 are the operative parts 16 of the sander and in addition to the driving roll 48 and the supporting shoe 19 comprise a supporting or idler roll 60 rotatably mounted on a supporting plate 61 carried by the wall 18. The supporting or idler roll 60 has a hub 63 in which is inserted sleeve bearings 65 for sliding engagement with a shaft 66. A bearing ring 67 is seated in a recess 68 in the hub of the roll 60 and is sealed therein by the oil seal type cap 69 engaging over the end edges of the hub of the roll 60. The shaft 66 has a shoulder 70 against which is pressed a bearing washer 71 by the nut 72 threaded on the threaded end 73 of the shaft 66 after the shaft 66 passes through the aperture 74 in the outer end portion of the supporting plate 61. The nut 72 locks the shaft 66 to the plate 61 against rotation relative thereto. A screw 75 is threaded through an oil seal type cap 76 into the other end of the shaft 66 for holding the supporting roll 60 on the shaft 66 for rotation about the axis of said shaft. Underneath the cap 76 and around the outer end of the shaft 66 is a sleeve bearing 65 and ring 67, the same as illustrated on the inner end portion of the shaft in FIGURE 4. By removing the screw 75 and cap 76 oil can be added to the bearings 65, 68 about the shaft 66 for lubricating the roll relative to the shaft.

The idler roll supporting plate 61 is elongated and has a T head 80 on the end remote from the supporting roll 60 which head 80 is positioned beyond a vertical mounting strap 81 fastened to the inside of the wall 18 by screws 82, 83. The plate 61 is adapted to move longitudinally of the housing in a shallow longitudinal groove or track 85 formed in a raised portion 86 on the inside of the wall 18. The screw 82 for securing the strap 81 in overlapping relation to the plate 61 is threaded into said raised portion 86. As can best be seen in FIGURE 5, the strap 81 is offset rearwardly at the upper portion thereof and is secured to the wall 18 by the screw 83 passing from outside the wall into the threaded opening in the strap.

It will be noted that an elongated vertical oriented offset 88 is formed in the strap 81 in that portion overlapping the plate 61 so that face 87 of the offset engages against the outer face of the plate 61 along a vertical line creating in effect a line contact therewith. A concave slot 90 is formed in the raised portion 86 of the wall 18 and is aligned with, parallel to and spaced from said vertical offset 88 in the strap 81. An elongated cylindrical bearing pin 91 of hardened steel or the like is seated in said concave slot 90 and presents a line contact with the surface of the plate 61 on the side opposite the line contact with the face 87 of the offset 88 in the strap 81. The line contacts with the plate 61 reduces the friction of the walls of the groove 85 and the strap 81 on said plate when said plate is moved longitudinally of the housing. The line contacts also form the axis for the plate 61 about which said plate can pivot in the direction transverse to said axis. The plate 61 has an offset 92 in its upper edge which is adapted to engage the end 93 of part of the raised portion 86 to limit the movement of the plate 61 in the rearward direction. The head 80 on the left end of the plate 61 engages with the end 94 of the raised portion 86 to limit movement of the plate 61 in the direction of the front of the sander or in the direction away from the driving roll.

Approximately in the mid portion of the plate 61 is a cut-out section 96 having a tongue 97 projecting into said cut-out 97, from one end wall thereof. A heavy compressed coil spring 99 has one end engaged around said tongue 97 and has another end bearing against the bottom of the recess 100 in the raised portion 86. The spring 99 urges the plate 61 and its roll 60 to the right. When no belt 50 is around the rolls 48 and 60 the spring 99 urges the plate and roll all the way to the right (FIGURE 3) until the head 80 on the plate engages with the end 94 of the raised portion 86.

The means that is provided for adjusting the supporting roll 60 for proper tracking of the belt 50 also includes the additional feature of providing the lock for holding the supporting roll in the belt removing position. Specifically, the wall 18 of the sander has an aperture 104 therein through which extends the adjusting latch mechanism 105 comprising a body member 106 having one portion 107 relatively flat and rectangular in cross-section and another portion 108 being cylindrical and threaded for threaded engagement with the adjusting nut 110. The nut 110 has a cylindrical wall 111 and a serrated gripping portion 112. The end of the cylindrical wall 111 bears against a bearing-type washer 114 on the wall 18 surrounding the body member 106. The flat portion 107 extends through an elongated slot 116 in the plate 61 and has a transverse pin 118 through the outer end of said portion 107 overlapping with portions adjacent the slot 116 of the plate 61. The plate 61 has a depressed portion or recess 121 lying transverse to the axis of the slot 116. The pin 118 on the body member 106 is adapted to bear against the face of the plate 61 on either side of the slot 116 throughout a substantial portion of the length of the slot. However, the pin 118 is adapted to nest in said depressed portion 121. The inside of the wall 18 surrounding the adjusting latch mechanism 105 has a raised or thickened section 123 having spaced bosses 125, 126 on opposite sides of the aperture 104 in the wall 18. An elongated bow shaped leaf spring 128 is provided with one end 129 curled slightly and bearing against the boss 125 with the center part of the bow of the spring 128 extending away from the wall 18 and with the other end 130 bearing against the other boss 126 such that said center part of the spring engages with the one side of the plate 61. The spring 128 has an opening 132 extending through the body of the spring so that the flat portion 107 of the body member 106 freely passes through said opening 132. The spring 128 is positioned between the wall 18 and the plate 61 and about the member 106 so as to be held in position and for resiliently urging the plate 61 against the pin 118 in the body member 106. The pin 118 will position itself along the face of the plate 61 or in the recess 121 in the plate 61. The spring 128 urges the pin 118 against the face of the plate 61 (solid line left-hand position of FIGURE 3) and the end of the nut 110 is urged against the washer 114 and the outer surface of the wall 18.

It will be obvious, that upon turning the nut 110 in one direction, the body member 106 will be moved outward of the wall 18 to bring the pin 118 and plate 61 closer to the wall 18 and to further compress the spring 128. The plate 61 and the idler roll 60 carried thereby will be adjusted relative to the wall 18 by the turning of the nut 110. With a belt 50 passing around the rolls 48 and 60 it is important that the axis of the said rolls be parallel to each other so as to apply even pressure to the belt across the width thereof and to prevent the belt from working one way or the other off the rolls. The nut 110, when turned, moves the idler roll 60 and its supporting plate 61 about an axis along the line contact created by the pin 91 bearing against the plate 61. The pin 91 presents a low resistance pivot for the plate without the interference caused by a flat surface engagement or without the need for a complex hinging or bearing arrangement. It will be noted in FIGURE 4 that the axis of the coil spring 99 extends from the recess 100 outwardly toward the tongue 97 on the plate 61. The spring 99 is compressed and is therefore urging the plate 61 and the roller 60 toward the right in FIGURES 3 and 4 which will further tend to pivot the plate 61 about the contact with the pin 91 and against the restraint created by the pin 118 bearing against the face in the plate 61. Therefore, as the nut 110 is turned in the proper direction, the pin 118 will move the plate 61 and idler roll 60 against the springs 99 and 128 until the axis of the roll 60 is parallel to the axis of the roll 48 whereupon the belt 50 will traverse the rolls in a correctly adjusted fashion. Conversely, as the nut 110 is turned in the opposite direction the springs 99 and 128 will urge the plate 61 against the pin 118 as it moves away from the wall 18, likewise moving in varying relationship of the axis of the axis of the idler roll 60 relative to the axis of the roll 48.

In order to effect removal and replacement of the belt 50 the adjusting latch mechanism 105 serves a second function. Specifically, the idler roll 60 and its supporting plate 61 are adapted to be moved longitudinally of the wall 18 against the action of the spring 99. By urging the idler roll 60 to the left in FIGURES 3 and 4, the spring 99 is further compressed and the plate 61 moves relative to the pin 118 on the member 106 so that the pin 118 slides along the face of the plate 61 as the plate 61 is moved to the left until the pin 118 is pulled into the recess 121 in the plate 61 by the action of the springs 128 and 99 urging the plate 61 away from the wall 18. The urging of the springs on the plate 61 and pin 118 is sufficient to hold the pin 118 in the recess 121, thereby holding the idler roll 60 at a point closer to the roll 48. In this retracted position the belt 50 can be removed and replaced with ease. With a new belt loosely in position around the rolls 60 and 48 it is only necessary to apply a small amount of pressure to the roll 60 toward the wall 18 which compresses the spring 128 enough to disengage the pin 118 from the recess 121 whereupon the spring 99 will drive the plate 61 and roll 60 to the fully extended position allowed by the length of the belt 50. That is, the belts 50 are made to be slightly shorter than the fully extended distance possible between the axis of the rolls 48 and 60 such that when a belt is in position on the rolls, the axis of the rolls are not as far apart as they could be and the spring 99 is urging the rolls with considerable force into position within the belt to tension the belt for use.

As the roll 60 and plate 61 are moved to the left or right in FIGURES 3 and 4, the plate slides in the groove of track 85 and between the pin 91 and the face 87 of the recess 88 in the strap. Since the contact between the pin 91 and the face 87 of the recess 88 and the plate 61 are line contacts relatively little friction or resistance is created therebetween and the plate slides relative thereto. The pin 91 is of hardened material such as to reduce wear on the parts of the wall 18 that would otherwise form the contact surface for the sliding of the plate. In addition, the pin 91 sometimes rolls about its longitudinal axis in the recess 90 in the portion 86 of the wall which further reduces the drag on the plate 61 when it is moved.

Beneath the supporting shoe 19 is fastened a cushioning structure which bears against the inside of the belt and acts as a pressure plate for said belt. The structure comprises a composition-type backing pad 135 of felt, cork, rubber or the like extending in overlapping relation to the face of the shoe 19. The shoe 19 has its forward edge portion 137 tilted slightly upwardly and inwardly away from the plane of the belt 50 and is adapted to receive and hold fastening means, such as screws 138, passing through the end portion 140 of a spring wear plate 141 and the end portion 142 of the backing pad 135. The edge portion 137 of the shoe is located in such a way that the screws 138 for holding the pad and plate thereto are out of the way so as not to contact or interfere with the belt as it is driven around the rolls 48 and 60. The spring plate 141 has a slight outward bow in its central portion under the shoe 19 for applying a slight additional tensioning force to the belt and to provide a back-up cushion along with the pad 135 for the belt as it is pressed against a surface being dressed. The added pressure on the belt caused by the plate and pad will further tension the working reach of the belt so as to more effectively urge the belt against the work surface.

During use of the sander it has been found that the belt develops considerable heat due mostly to the friction between the belt and the surface being dressed, but also due to the rapid flexing of the belt over the rolls and across the spring plate 141. In an effort to reduce the ill effects of this heat build up (scorching of the surface, and smoking of the dust), novel cooling means is provided and comprises an opening 150 in the mounting base 10 extending from the motor casing 12 to substantially the central area of the upper reach of the belt 50. The motor is provided with a cooling fan 152 which draws air into the motor casing 12 through the vents 25, passes it over the motor and in part down through the opening 150 and onto the top reach of the belt 50. The blast of air striking the belt dissipates a large amount of heat from the belt and blows the dust off the belt and away from the tool. The cooler belt runs better, lasts longer, is not likely to scorch the work surface and reduces the danger of fire and/or smoke from the dust coming in contact with the overheated belt. The air blows the dust from the belt and travels around inside the housing and is deflected downwardly by the wall 18 and overhang 30 onto the work surface to blow the dust away from the work area.

Within the confines of the sander and fastened as by screws 161 to the wall 18 is a wear plate 163. The plate 163 is an elongate strip of wear resistant material secured along the edge of the upper reach of the belt 50 substantially the full distance between the rolls 48 and 60. The plate 163 extends above and below the upper reach of the belt a small amount so that the belt will not be likely to get hung up above or below the plate 163 during loading of the belt on the rolls such that release of the pin 118 from recess 121 could cause the belt to be torn along its edge or otherwise damaged. In loading, the belt 50 is inserted loosely in the housing, up against the plate 163 and around the rolls 48 and 60 whereupon release of idler roll 60 will snap the belt into position with the edge of the upper reach just barely touching the wear plate 163. This plate 163 eliminates the wearing away of the inside of the wall 18 caused by the abrasive edge of the belt constantly contacting the wall during use. The wear plates does away with the wear. The plate 163 can be readily replaced when it becomes excessively worn.

Earlier herein the gear train for driving the belt was described briefly and in particular the laminated gear 32 as part of the gear train was mentioned. In power tools, direct drive of the driven parts of the device is desirable. However, in the past the power from the motor was transmitted through metal gears to the driven part such that any sudden obstruction encountered by the driven part would slow or stop the driven part suddenly and maybe only instantaneously but nevertheless enough to transmit a shock back through the gears to the motor. The results of the shocks caused gears to be stripped, shafts to be bent, spots to be burned on the armatures of motors, or burned the motors out altogether, and the like. The gears are noisy and create vibrations that are undesirable. Some attempt has been made to eliminate these ill effects by going to a pulley drive which did eliminate the transmission of shock loads to the motor but have the inherent disadvantages of a non-direct drive, namely, more difficult to get the reductions in speed and power increase desired, slippage, wear of belts, replacement problems, heating of the belt and the like. Means is provided herein for taking advantage of the direct gear drive without the disadvantages created by the transmission of shocks and the like to the motor.

The direct drive set of gears 32, 34, 35, 42 and 43 transmit the power from the motor to the driving roll 48 and is designed to properly alter the motor speed to accomplish the desired speed and power at the driving roll 48. The gear 32 is a specially constructed plastic gear made up, in this instance, of cross-laminations of fibrous material in a resin. One such gear has been made up of layers of linen impregnated with phenolic resin (one such being the trademarked product "Insurok"). Every layer was stacked on top of the preceding layer with the fibers of the material running at an angle (or crosswise) with respect to the fibers of the preceding layer. After a sufficient number of layers have been built up, the stack is pressed and cured in the accepted manner. The desired gear contour is cut into the cured laminated stack so that a gear 32 of the desired shape and size results. With the gear 32 keyed to the shaft 31 of the motor and meshing with gear 34 as hereinbefore described, the direct drive gear train is established. Energization of the motor will drive the roll 48 through the gear train including the gear 32. The characteristics of the gear 32 are such that any momentary stoppage and starting of the roll 48, overload, any sudden shocks created by the belt creeping and then releasing, or the like, will be transmitted through gears 43, 42, 35 and 34 to gear 32. However, gear 32 will not transmit said shock to the motor shaft 31, but instead will absorb the shock in the laminated body of the gear. In this way, the advantages of the direct gear drive can be used without the disadvantages created by the transmission of the shocks to the motor. The motor brushes and bearings will wear longer as will the overall sander. The gear 32 also absorbs the noise usual in gear drives and dampens out undesirable vibrations resulting in a quieter operating device.

In preparing for operation, the sander is tilted forward and pressure is exerted against the fore idler roll 60 which will move with its supporting plate 61 into the housing against the action of the spring 99 until the spring 128 urges the pin 118 into the holding recess 121 (the dotted line position of FIGURES 3 and 4). A new belt (sandpaper or the like) is inserted loosely around the rolls 48 and 60. The roll 60 is pressed sidewise toward the wall 18 until the pin 118 disengages from the recess 121 whereupon the spring 99 will drive the roll 60 into engagement with the inside of the belt. The spring 99 continues to urge the roll 60 against the belt to tension the belt on the sander. The belt passes around the roll 48 over its composition layer 49 (i.e. rubber) and over the tension plate 141 and back-up pad 135 on the shoe 19.

The relative alignment of the axes of the rolls 48 and 60 is checked and if found to be out of alignment can be adjusted by rotating the nut 110 in the proper direction. The alignment can also be checked by holding the sander in the air or cocked up on the end 30 of its housing and given a short burst of power to drive the belt. If the axes of the rolls are not aligned, the belt will either try to run off the rolls or will try to climb into the wall 18 of the sander. The proper adjustment can be made to correct these conditions by turning the nut the correct amount in one direction or the other. For operation, the switch 28 on the handle is depressed to turn on the motor and drive the driving roll 48 through the laminated gear 32 and the meshing coacting gears for rotating the belt 50 relative to the housing and relative to the work surface being dressed. The motor pulls air into the housing 12 and ejects it onto the top reach of the belt to cool the belt and to blow dust from the belt and from around the surface being dressed.

I claim:

1. A belt sander comprising a housing having a supporting base with a side wall downwardly extending therefrom, a driving shaft journaled in one end portion of said wall and having a driving roll keyed thereon within said housing, a gear keyed to the driving shaft on the outside of said wall, a pair of parallel shafts axially movable in bearing journals seated in spaced apart relation in said side wall, a pair of meshing spur gears keyed to said parallel shafts, a pinion gear keyed to one of said parallel shafts and meshing with the gear on the driving shaft, a motor mounted on the supporting base of the housing and having an output shaft, a laminated fibrous gear keyed to said output shaft and meshing with one of said spur gears, a plate secured to the side wall for enclosing said meshing gears, a resilient wear plate carried on the inner surface of the plate and bearing against the ends of said pair of shafts, the resilience of said wear plate holding said pair of shafts seated in said bearing journals, and an idler roll carried by the housing in spaced relation to the driving roll, whereby said driving roll and said idler roll are adapted to have an abrasive belt encircling said rolls whereby said motor drives said abrasive belt through said intermeshing gears.

2. A belt sander having a housing, a motor carried by said housing, a driving roll carried by the housing and being driven by said motor, an idler roll, and means for movably mounting said idler roll on said housing in spaced relationship to the driving roll, said driving roll and said idler roll being adapted to receive an abrasive belt in encircling relationship, said idler roll mounting means comprising an elongated supporting plate extending transversely to the axis of the idler roll rotatably carried on one end portion thereof, said plate having limited longitudinal movement along the axis of the plate and being pivoted about an axis fixed relative to said housing, means for holding said plate in position relative to said housing, spring means urging said plate and idler roll in a direction away from the driving roll, adjusting means carried by the housing and having means engaging with one portion of said plate through a longitudinal opening in said plate, compression spring means urging said plate into engagement with plural positions on said means on said adjusting means, said idler roll and plate being movable to a position closer to the driving roll and latched in said position by said means on said adjusting means engaging in a detent in said plate, and means on said adjusting means for adjusting the angular relation of the plate and idler roll relative to the axis of the driving roll.

3. A belt sander having a housing with a base having a downwardly depending sidewall, a motor on said base, a driving roll carried by said base and being driven by said motor, an idler roll, and means for movably mounting said idler roll on said base relative to said driving roll, said driving roll and said idler roll being adapted to receive an abrasive belt in encircling relationship, said means for mounting said idler roll comprising a plate lying in a plane substantially parallel to said side wall of said housing, said idler roll being rotatably carried by said plate on a cantilever axis lying transverse to the plane of said plate, an elongated pin engaging the side of said plate and seated between said plate and the side wall of said housing, means for holding said plate in position relative to said pin with the side of said plate engaging in line contact with the surface of said pin whereby said plate may pivot or slide relative to the surface of said pin, adjusting means carried by the housing and engaging with one portion of said plate removed from said pin, and means on said adjusting means for adjusting the angular relation of the plate about the line of contact on the surface of the pin to align the axis of the idler roll parallel to the axis of the driving roll.

4. A belt sander comprising a housing having a supporting base with a side wall downwardly extending therefrom, a driving shaft journaled in one end portion of said wall and having a driving roll keyed thereon within said housing, a gear keyed to the driving shaft, at least one axially movable shaft journaled in said side wall, at least one spur gear keyed to said shaft and operatively connected with the gear on the driving shaft, a motor mounted on the supporting base of the housing and having an output shaft, a laminated fibrous gear keyed to said output shaft and operatively connected with said spur gear, a plate secured to the side wall for enclosing said operatively connected gears, a resilient wear plate carried on the inner surface of the plate and bearing against the end of said at least one shaft journaled in said side wall, the resilience of said wear plate holding said shaft seated in its bearing journal, and an idler roll carried by the housing in spaced relation to the driving roll, whereby said driving roll and said idler roll are adapted to have an abrasive belt encircling said rolls whereby said motor drives said abrasive belt through said intermeshing gears.

References Cited

UNITED STATES PATENTS

| 2,262,978 | 11/1941 | Vesely. | |
| 1,601,913 | 10/1926 | Guay | 74—445 |
| 2,106,535 | 1/1938 | Pattison | 51—170 |
| 2,129,280 | 9/1938 | Lange. | |
| 2,621,453 | 12/1952 | Oren | 51—170 |
| 3,148,556 | 9/1964 | Gibbs | 74—170 |
| 3,176,436 | 4/1965 | Anton | 51—170 |

HAROLD D. WHITEHEAD, *Primary Examiner.*

U.S. Cl. X.R.

51—170